E. TOOLE & J. H. MacLENNAN.
MACHINE FOR MAKING ARTIFICIAL STONE BLOCKS.
APPLICATION FILED OCT. 18, 1907.
963,833.
Patented July 12, 1910.
3 SHEETS—SHEET 1.
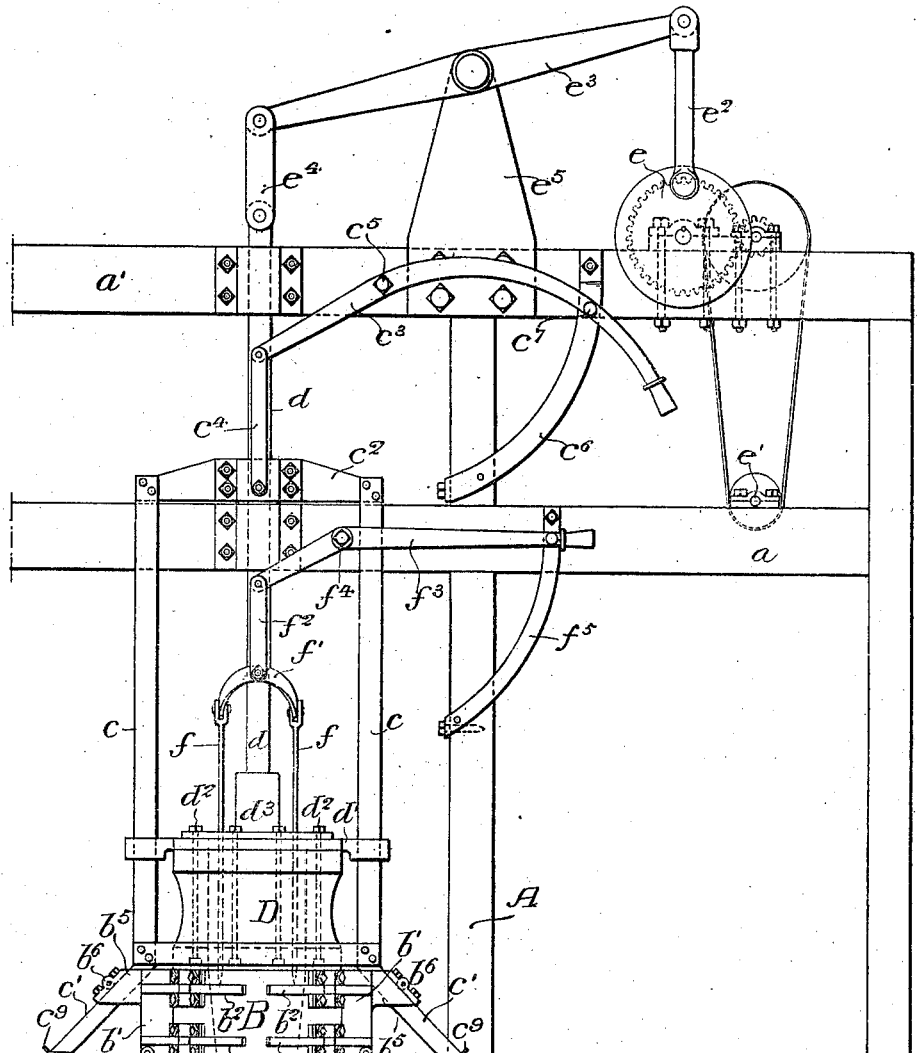
Fig. 1.
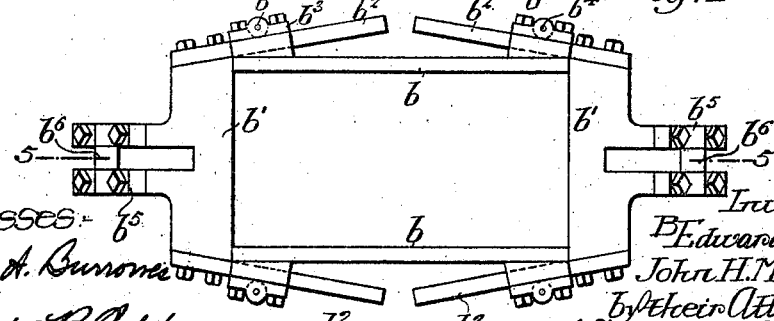
Fig. 4.

E. TOOLE & J. H. MacLENNAN.
MACHINE FOR MAKING ARTIFICIAL STONE BLOCKS.
APPLICATION FILED OCT. 18, 1907.
963,833.
Patented July 12, 1910.
3 SHEETS—SHEET 2.
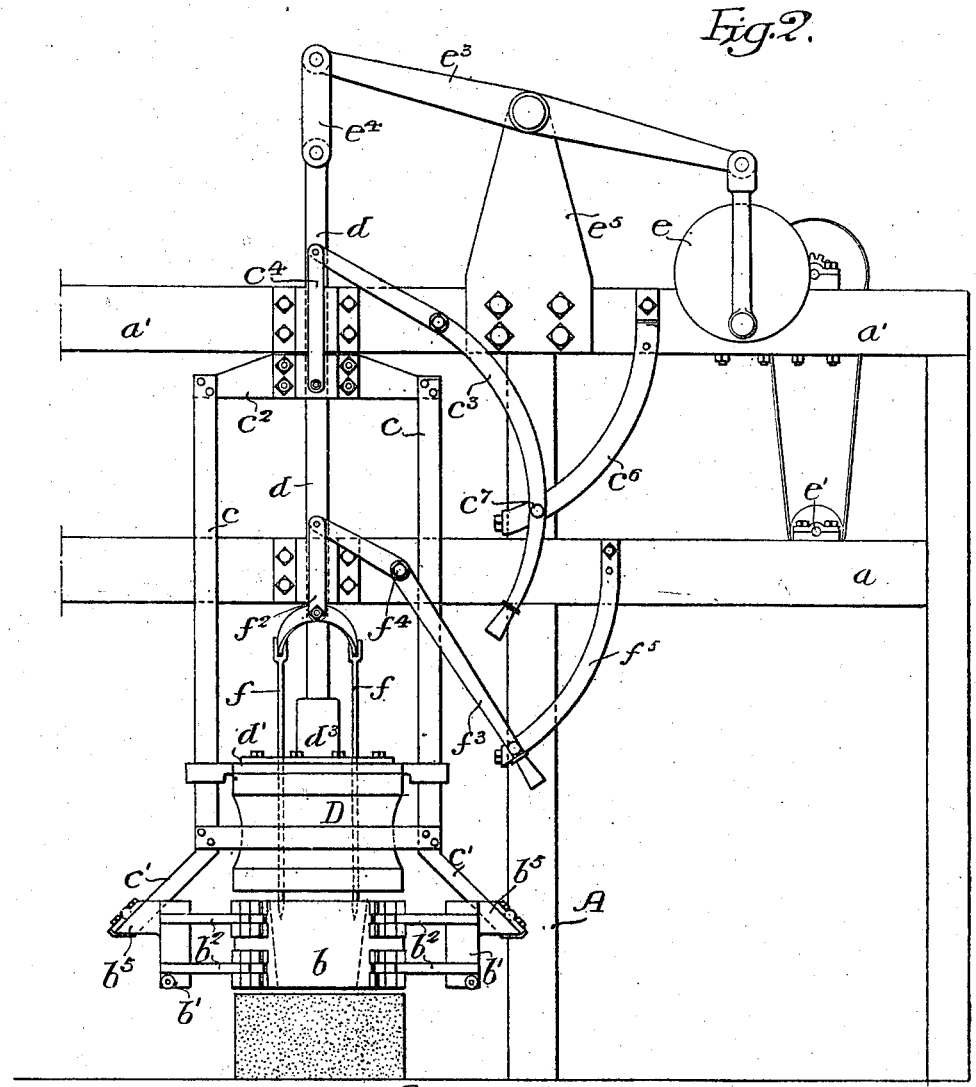
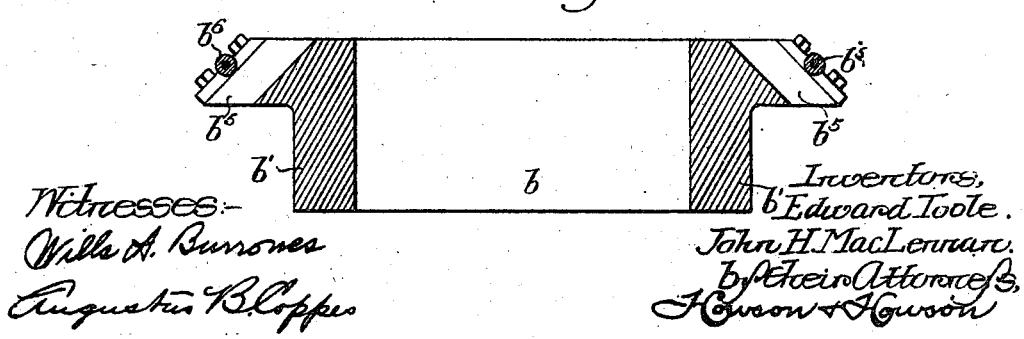

E. TOOLE & J. H. MacLENNAN.
MACHINE FOR MAKING ARTIFICIAL STONE BLOCKS.
APPLICATION FILED OCT. 18, 1907.
963,833.
Patented July 12, 1910.
3 SHEETS—SHEET 3.
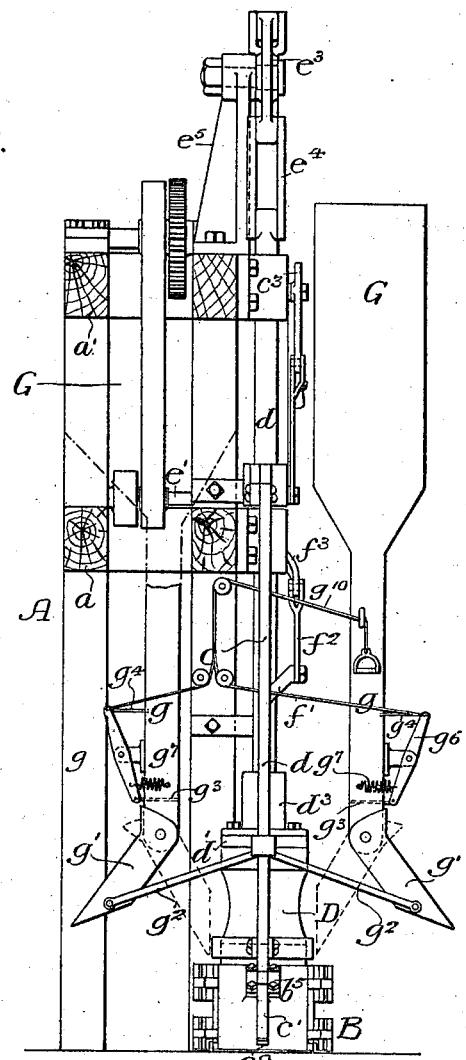
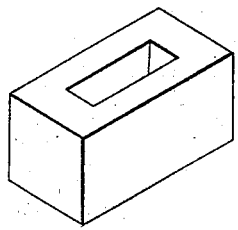
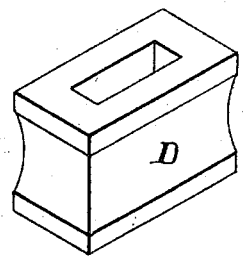
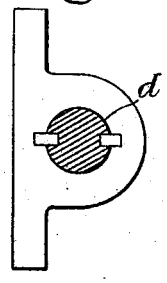
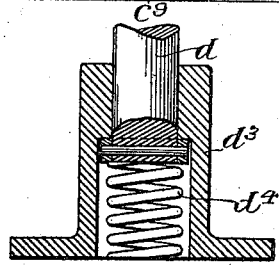
Witnesses:—
Willa A. Burrowes
Augustus B. Coppes
Inventors,
Edward Toole.
John H. MacLennan.
By their Attorneys,
Howson & Howson

UNITED STATES PATENT OFFICE.

EDWARD TOOLE AND JOHN H. MacLENNAN, OF GLOUCESTER CITY, NEW JERSEY.

MACHINE FOR MAKING ARTIFICIAL-STONE BLOCKS.

963,833.  Specification of Letters Patent.  Patented July 12, 1910.

Application filed October 18, 1907. Serial No. 398,064.

*To all whom it may concern:*

Be it known that we, EDWARD TOOLE and JOHN H. MACLENNAN, citizens of the United States, residing in Gloucester City, New Jersey, have invented certain Improvements in Machines for Making Artificial-Stone Blocks, of which the following is a specification.

One object of our invention is to provide a machine of relatively simple and inexpensive construction for rapidly forming or molding concrete or other plastic material to form building blocks:—it being further desired that the machine shall be capable of making blocks of a uniform quality and that without necessitating the use of highly skilled labor for its operation.

Another object of the invention is to provide a machine having the above characteristics and which shall to some extent be automatic in its operation; its parts being so arranged that they shall be relatively durable as well as not easily injured or liable to get out of order under operating conditions.

These objects and other advantageous ends we attain as hereinafter set forth, reference being had to the accompanying drawings, in which:—

Figure 1, is a side elevation of our machine with the hopper and chutes removed, showing the mold in its closed position; Fig. 2, is a side elevation similar to Fig. 1, showing the mold in its open position; Fig. 3, is an end elevation of the machine shown in Figs. 1 and 2, the mold being closed; Fig. 4, is a plan of the mold in its closed condition; Fig. 5, is a vertical section of the mold on the line 5—5, Fig. 4; Fig. 6, is a vertical section on an enlarged scale illustrating in detail the connection between the plunger and its operating lever; Fig. 7, is a perspective view of one form of building block which may be made by our invention; Fig. 8, is a perspective view of the plunger employed to compact material in the mold; Fig. 9, is a perspective view of one form of core for the mold, and Fig. 10, is a sectional plan showing the means for preventing turning of the plunger rod.

In the above drawings, A represents any suitable supporting framework for the machine, which in the present instance is designed to be used in the manufacture of concrete or other blocks having the general shape shown in Fig. 7. These blocks are formed in a mold B which is provided with two similar side members $b$ movably connected to two end members $b'$ and these latter are in turn movably attached to a pair of suspending bars $c$. Each end member is provided at its opposite sides with outwardly inclined guide bars $b^2$ so placed that when the parts of the mold are assembled the bars at each end thereof extend toward those of the other end. Each of the side members $b$ is provided with suitable guide ways $b^3$ for the reception of the guide bars $b^2$ and each guide way preferably has an anti-friction roller $b^4$ so that it is free to move upon its guide bar with but little friction. Each of the end members $b$ is also provided with a guide way $b^5$ having an anti-friction roller $b^6$ and designed for the reception of downwardly inclined guide bars $c'$ carried respectively at the lower ends of the suspending bars $c$. The mold is open at the top and bottom, being designed to rest upon a suitable supporting structure $A'$ upon which its movement is facilitated by rollers $b^7$ preferably mounted on the end sections $b'$, as shown in Figs. 1 and 2. The two suspending bars $c$ for the mold extend in the present instance above the cross member $a$ of the frame and are united by a transverse piece $c^2$ splined to a vertically movable plunger rod $d$. For the purpose of moving this transverse member $c^2$ up and down on the plunger rod and with it the mold B, we provide a hand operated lever $c^3$ connected to said member. In order that this lever may be maintained at either extremity of its possible path of movement, there is provided a segmental piece $c^6$ having holes for the reception of pins $c^7$ passing through said lever.

For the purpose of tamping or compressing the loose plastic or other material within the mold, we provide a plunger D, preferably of the construction illustrated in Fig. 8 and detachably mounted upon a plate $d'$ having extensions through which pass the suspending bars $c$ of the mold, whereby it is guided so as to be incapable of turning as well as definitely positioned as regards the distance of its lower edges from the sides of the mold. For the purpose of holding this plunger to the plate $d'$ we employ bolts $d^2$ extending through it and the plunger, as illustrated in Fig. 1. A flanged casting is also held to the upper side of the plate $d'$ by the bolts $d^2$ and is provided with a hollow boss into which extends the lower end of the plunger rod $d$. Said rod is provided with any desired means whereby it is movably connected to said casting and there is placed within the boss of the latter a spring $d^4$, mounted between the end of the rod $d$ and the upper surface of the plate $d'$. The upper end of the plunger rod is guided through suitable bearings on the members $a$ and $a'$ of the frame A, and, as shown in Fig. 10, is provided with key ways for the reception of set screws or other form of key whereby it is prevented from turning while being free to move longitudinally. For reciprocating the plunger we provide a crank $e$ operated through any desired form of gearing from a driving shaft $e'$ and connected through a rod $e^2$, a lever $e^3$, and a link $e^4$ to the upper end of the plunger rod $d$; said lever in the present instance being fulcrumed upon a bracket $e^5$ supported from a member $a'$ of the frame A.

The various parts above described are so arranged and proportioned that the plunger cannot be lowered by the operation of the crank below the level of the top of the mold, and, as will be understood, in case of an excessive amount of material being placed in the mold, it is free to yield at the point of connection of the rod $d$ and the plate $d'$ on account of the compressibility of the spring $d^4$.

As shown in Fig. 8, the plunger D is hollow and there is vertically movable within it and the mold B, a core F preferably tapered from the top toward the bottom so as to be easily withdrawn from the mold into the plunger D. For this purpose we provide a pair of vertically extending rods $f$ fixed to the core and connected through a yoke $f'$ and a link $f^2$ to a hand lever $f^3$, pivoted at $f^4$ to a member $a$ of the frame A. This lever has a curved bar $f^5$ to which it may be pinned at either extremity of its possible path of movement.

For the purpose of introducing material into the mold we mount a hopper or hoppers G upon the frame of the machine and provide these with chutes $g$ having movable end sections $g'$ pivoted to them. These sections are connected by links $g^2$ to the plunger D and are so arranged that when the latter is raised they will be in position to deliver material into the mold, as indicated in dotted lines. When the plunger is in its lowered position, these sections are turned to the position illustrated in full lines in Fig. 3, so as to be out of the way of the mold. We may, if desired, provide the chutes $g$ with some device whereby predetermined amounts of material may be delivered to the mold and for this purpose we provide in each chute two transversely movable slides $g^3$ and $g^4$ connected by a lever $g^5$ and so arranged that either of them is capable of being moved to cut off the flow of material through the chute. Each pair of these slides has a spring $g^7$ placed to act on its lever so that the lower slide $g^3$ is normally maintained in a position to close the chute. For the purpose of operating the levers $g^6$, we provide any desired form of actuating device, which in the present instance consists of a rope or cable $g^{10}$.

Under operating conditions, when it is desired to close the mold, the lever $c^3$ is moved from the position shown in Fig. 2, to that shown in Fig. 1, and it will be noted that this results in the lower edges of the mold sections being brought into contact with the surface of the supporting structure A′ some time before said lever has been completely moved the full length of its stroke. The continued downward pressure upon the suspension bars $c$ causes their inclined portions $c'$ to so co-act with the guide ways $b^5$ of the end sections $b'$ that these are forcibly pushed together, until they finally occupy the positions shown in Fig. 4. This coming together of these sections likewise causes the guide bars $b^2$ of the said sections to slide in the guide ways of the side sections $b$, thereby moving them inwardly until, when they occupy the positions shown in Fig. 4, the mold is completely closed and ready to receive material for forming a block. It will be understood that the movement of the various guide bars $c$ and $c^2$ in their guide ways is facilitated by the anti-friction rollers $b^4$ and $b^6$, as is also the moving together of the end members $b'$ upon their supporting surface by the rollers carried by them. The core F is now lowered into the mold by moving the hand lever $f^3$ from the position shown in Fig. 2 to that shown in Fig. 1, and inasmuch as the pivoted discharge sections $g'$ of the chutes are in their inner positions and since the plunger D is raised, the block forming material may now be admitted in predetermined amounts from the hopper or hoppers by proper manipulation of the cable $g^{10}$:— the amount delivered being dependent upon the volume inclosed between the two pairs of slides $g^3$ and $g^4$. By pulling down upon the rope or cable $g^{10}$, the levers $g^5$ are so operated that the slides $g^4$ are forced through the material in the chutes so as to prevent further flow from the hopper, while the slides $g^3$ are pulled outwardly so as to permit the material confined between them and the slides $g^4$ to be discharged. After the measured amount of material (which may be of any desired form of concrete or other plastic or moldable material) has entered the mold, the releasing of the cable permits the slides to resume the positions shown in Fig. 3 under the action of the springs $g^7$ and the crank $e$ is caused to make one or more complete revolutions, thereby lowering the plunger D from the position shown in Fig. 2 to the position illustrated in Fig. 1, so that the material in the mold is compressed to any desired degree until its top surface is coincident with the top edges of the mold. If for any reason the material should be so unevenly distributed in the mold as to prevent the plunger being forced down to the full length of its stroke, the spring $b^4$ will yield and thereby prevent injury to any of the parts; the crank in any case being stopped in any desired manner so that the plunger remains in its raised position. The core is now raised in the mold by turning the hand lever $f^3$ from the position shown in Fig. 1 to that shown in Fig. 2, after which the hand lever $c^3$ is similarly brought into the position necessary for raising the mold.

It will be noted that as soon as the suspension bars $c$ are moved upwardly, the weight of the mold section causes its end members to slide outwardly upon their guide bars $c'$, thereby at once moving them away from the molded block and this outward movement of the end members causes a movement of the side members $b$ away from the sides of the block by reason of the co-action of the guide bars $b^2$ and the guide ways $b^3$. The outward movement of the end members $b'$ continues until the guides $b^5$ engage stops $c^9$ in the end of the guide bars $c'$, after which the further vertical movement of the suspension bars $c$ causes the mold to be bodily raised into the position shown in Fig. 2. Such bodily movement of the mold section is made possible by reason of the fact that the upward movement of the plunger D has through the links $g^2$ caused the discharge sections $g'$ of the chutes to swing outwardly on their pivots to the positions shown in Fig. 3. The finished block may now be removed, after which the machine is ready for use to form another block.

We claim:

1. The combination in a molding machine of a mold having a plurality of relatively movable sections, suspension bars for said sections, a supporting structure for the mold, and guide bars and guide ways connecting the suspension bars and the mold sections, the same being arranged to cause the sections to move together when the guide bars are lowered and to separate when said bars are elevated.

2. A molding machine including a mold provided with sections having guide ways, suspension bars having inclined ends, and guide ways on the end sections for the reception of said guide bars.

3. A molding machine including a mold having end and side sections, said end sections being provided with outwardly inclined horizontal guide bars and the side sections having guide ways for the reception of said bars, a supporting frame having vertically movable suspension bars provided with outwardly inclined end portions, and guide ways on the end sections of the mold for the reception of the said end portions of the suspension bars.

4. The combination of a frame having suspension bars, a mold connected to said bars and having its parts arranged to automatically separate when the bars are raised, a plunger, and means whereby the plunger is reciprocated to compact the material in the mold.

5. The combination of a stationary frame, a pair of vertically movable suspension bars on the frame, a mold consisting of a number of sections attached to said suspension bars and constructed to automatically separate when said bars are elevated, with a hand operated device for raising said bars and the mold.

6. The combination of a frame, a pair of vertically movable suspension bars on the frame, a mold consisting of a number of sections attached to said suspension bars, and constructed to automatically separate when said bars are elevated, a hand operated device for raising said bars on the mold, a core for the mold, and means for raising said core.

7. The combination in a molding machine of a mold, a frame having bars forming guiding structures, and serving also as the means for raising and lowering the mold, a plate removable on said guiding structures, a plunger movably attached to said plate, and means for reciprocating the plate on the guide bars.

8. The combination in a molding machine of a frame having a mold, suspension bars for said mold, a plate slidably mounted on said bars so as to be guided thereby, a plunger attached to the plate, and means for moving the plunger on the bars.

9. The combination in a molding machine of a frame having a mold, suspension bars for said mold, a plate slidably mounted on said bars so as to be guided thereby, a plunger attached to the plate, means for moving the plunger, with a yielding connection between the plate and said plunger operating means.

10. The combination in a molding machine of a frame, a rod having means whereby it is reciprocated upon the frame, a cross bar slidably mounted on the rod and provided with suspension bars, a mold attached to said suspension bars, a plunger on the rod having a plate guided on the suspension bars, and means for actuating the rod on the suspension bars.

11. The combination in a molding machine, of a mold movable to release a finished article, a plunger for compacting material therein, a chute or chutes for delivering material into the mold, the same having a movable portion or portions arranged to be capable of extending into the path of movement of said mold or being moved away from the same, means for raising the plunger, and means connected to said plunger-raising means for moving the end portion or portions of the chute or chutes toward and from the mold.

12. The combination in a molding machine of a frame, a mold, a plunger for compacting material in said mold, means for moving the plunger toward and from the mold, means for moving said mold to release a finished block, a chute having end sections movable out of the way of the mold, and means for connecting said movable end sections to the plunger operating means so that when the plunger is raised said end sections will be moved into a position to discharge material into the mold.

In testimony whereof, we have signed our names to this specification, in the presence of two subscribing witnesses.

EDWARD TOOLE.
JOHN H. MacLENNAN.

Witnesses:
WILLIAM E. BRADLEY,
JOS. H. KLEIN.